(12) United States Patent
Akkarakaran et al.

(10) Patent No.: US 11,693,083 B2
(45) Date of Patent: Jul. 4, 2023

(54) POSITIONING ASSISTANCE DATA PROCEDURES

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/513,840

(22) Filed: Oct. 28, 2021

(65) Prior Publication Data

US 2022/0050165 A1 Feb. 17, 2022

Related U.S. Application Data

(63) Continuation of application No. 16/790,266, filed on Feb. 13, 2020, now Pat. No. 11,181,609.

(60) Provisional application No. 62/806,377, filed on Feb. 15, 2019.

(51) Int. Cl.
*G01S 5/02* (2010.01)
*H04L 5/00* (2006.01)
*H04W 64/00* (2009.01)
*H04W 8/24* (2009.01)
*H04W 80/02* (2009.01)
*H04W 76/27* (2018.01)
*H04W 72/23* (2023.01)

(52) U.S. Cl.
CPC .......... *G01S 5/0236* (2013.01); *H04L 5/0051* (2013.01); *H04W 8/24* (2013.01); *H04W 64/003* (2013.01); *H04W 72/23* (2023.01); *H04W 76/27* (2018.02); *H04W 80/02* (2013.01)

(58) Field of Classification Search
CPC ..... H04W 76/27; H04W 8/24; H04W 64/003; H04W 72/042; H04W 80/02; G01S 5/0236; H04L 5/0051
USPC ...................................................... 455/456.1
See application file for complete search history.

(56) References Cited

U.S. PATENT DOCUMENTS 8,699,460 B2 4/2014 Wachter
8,750,870 B2 6/2014 Palanki et al.
9,374,798 B2 6/2016 Edge
(Continued)

FOREIGN PATENT DOCUMENTS

WO 2011020083 2/2011
WO 2011085267 A2 7/2011
(Continued)

OTHER PUBLICATIONS

3GPP TS 36.355 V15.2.0 (Dec. 2018) (Year: 2018).*
(Continued)

*Primary Examiner* — William Nealon
(74) *Attorney, Agent, or Firm* — Thien T. Nguyen

(57) ABSTRACT

Disclosed are techniques for performing positioning operations. In an aspect, a user equipment (UE) transmits, to a positioning entity, a request for positioning assistance data message, the request for positioning assistance data message identifying a serving cell of the UE and one or more neighboring cells of the UE with which the UE is attempting to perform a positioning procedure, and receives, from the positioning entity, a positioning assistance data message in response to the request.

30 Claims, 14 Drawing Sheets

(56) References Cited

U.S. PATENT DOCUMENTS

| | | | |
|---|---|---|---|
| 2008/0228654 A1* | 9/2008 | Edge | G06Q 20/3829 |
| | | | 455/456.2 |
| 2011/0039578 A1 | 2/2011 | Rowitch et al. | |
| 2012/0015667 A1 | 1/2012 | Woo et al. | |
| 2012/0184302 A1 | 7/2012 | Kazmi et al. | |
| 2013/0122931 A1 | 5/2013 | Mitsuya et al. | |
| 2013/0315197 A1* | 11/2013 | Park | H04B 7/024 |
| | | | 370/329 |
| 2017/0332192 A1 | 11/2017 | Edge | |
| 2018/0217224 A1* | 8/2018 | Jain | H04W 64/003 |
| 2020/0264261 A1 | 8/2020 | Akkarakaran | |

FOREIGN PATENT DOCUMENTS

| | | |
|---|---|---|
| WO | 2011127419 | 10/2011 |
| WO | 2011150259 A1 | 12/2011 |

OTHER PUBLICATIONS

3GPP TS 36.305 V15.2.0 (Dec. 2018) (Year: 2018).*

3GPP TS 36.305 V15.2.0 (Dec. 2018), 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), 2018, pp. 1-88.

3GPP TS 36.355, "3rd Generation Partnership Project; Technical Specification Group Radio Access Network; Evolved Universal Terrestrial Radio Access (E-UTRA); LTE Positioning Protocol (LPP) (Release 15)", 3GPP TS 36.355, V15.2.0, Dec. 2018, pp. 1-220.

"3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN (Release 9)", 3GPP Standard, 3GPP TS 36.305, 3rd Generation Partnership Project (3GPP), Mobile Competence Centre, 650, Route Des Lucioles, F-06921, Sophia-Antipolis Cedex, France, No. V9.4.0, Oct. 11, 2010 (Oct. 11, 2010), pp. 1-52, XP050461964, [retrieved on Oct. 11, 2010], in combination with US20180217224A1, Sections 7.1.2.1 and 8.1.3.2.2, figures 8.1.3.2.2-1.

3rd Generation Partnership Project; Technical Specification Group Radio Access Network; NG Radio Access Network (NG-RAN); Stage 2 Functional Specification of User Equipment (UE) Positioning in NG-RAN (Release 15), 3GPP Draft, 38305-F20, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051686998, 69 pages, Retrieved from the Internet:URL: http://www.3gpp.org/ftp/3guInternal/3GPP%5Fultimate%5Fversions%5Fto%5Fbe%5Ftransposed/sentToDpc/38305%2Df20%2Ezip [retrieved on Jan. 11, 2019] in combination with US20180217224A1, Sections 8.1.3.2.2 and 8.2.2.1, figures 8.1.3.2.2-1.

International Search Report and Written Opinion—PCT/US2020/018364—ISA/EPO—dated Apr. 28, 2020.

Qualcomm Incorporated: "On Demand Transmission of PRS for NR," 3GPP Draft, 3GPP TSG-RAN WG2 Meeting #104, R2-1817902_ (On Demand PRS), 3rd Generation Partnership Project (3GPP), Mobile Competence Centre, 650, Route Des Lucioles, F-06921, Sophia-Antipolis Cedex, France, vol. RAN WG2. No. Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip [retrieved on Nov. 12, 2018], the whole document, Sections 9.2.x.3 and 9.2.x.6;figures9.2.x.3-1,9.2.x.6-1, 9.2.x.2.1,9.2.x.3.1.

* cited by examiner

POSITIONING ASSISTANCE DATA PROCEDURES

CROSS-REFERENCE TO RELATED APPLICATIONS

The present Application for patent is a continuation of U.S. patent application Ser. No. 16/790,266, entitled "POSITIONING ASSISTANCE DATA PROCEDURES," filed Feb. 13, 2020, which claims the benefit of U.S. Provisional Application No. 62/806,377, entitled "POSITIONING ASSISTANCE DATA PROCEDURES," filed Feb. 15, 2019, each assigned to the assignee hereof, and expressly incorporated herein by reference in its entirety.

INTRODUCTION

1. Technical Field

Various aspects described herein generally relate to wireless communication systems, and more particularly, to positioning assistance data procedures in New Radio.

2. Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, also referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor, for example. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

To support position estimations in terrestrial wireless networks, a mobile device can be configured to measure and report the observed time difference of arrival (OTDOA) or reference signal timing difference (RSTD) between reference radio frequency (RF) signals received from two or more network nodes (e.g., different base stations or different transmission points (e.g., antennas) belonging to the same base station). The mobile device can also be configured to report time of arrival (ToA) of RF signals. With OTDOA, when the mobile device reports the time difference of arrival (TDOA) between two network nodes, the location of the mobile device is then known to lie on a hyperbola with the locations of the two network nodes as the foci. Knowledge of the TDOAs between multiple pairs of network nodes allows a positioning entity (e.g., a location server) to solve for the mobile device's position as the intersections of the hyperbolas.

Round-trip time (RTT) is another technique for determining a position of a mobile device. RTT is a two-way RF messaging technique in which a transmitter (e.g., the network node) reports, to a positioning entity, the transmit-to-receive time difference between transmitting a reference RF signal to a receiver (e.g., the mobile device) and receiving a response RF signal from the receiver, and the receiver reports, to the same positioning entity, the receive-to-transmit time difference between receiving the reference RF signal from the transmitter and sending the response RF signal to the transmitter. The positioning entity (e.g., a location server) computes the distance between the mobile device and the network node based on these measurements. The location of the mobile device is then known to lie on a circle with a center at the network node's position. Reporting RTTs with multiple network nodes allows the positioning entity to solve for the mobile device's position as intersections of the circles.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In an aspect, a method for performing positioning operations at a user equipment (UE) includes transmitting, by the UE to a positioning entity, a request for positioning assistance data message, the request for positioning assistance data message identifying a serving cell of the UE and one or more neighboring cells of the UE with which the UE is attempting to perform a positioning procedure, and receiving, at the UE from the positioning entity, a positioning assistance data message in response to the request.

In an aspect, a method for performing positioning assistance operations at a positioning entity includes receiving, from a UE, a request for positioning assistance data message, the request for positioning assistance data message identifying a serving cell of the UE and one or more neighboring cells of the UE with which the UE is attempting to perform a positioning procedure, and transmitting, to the UE, a positioning assistance data message in response to the request.

In an aspect, a UE includes a memory, at least one transceiver, and at least one processor communicatively coupled to the memory and the at least one transceiver, the at least one processor configured to: cause the at least one transceiver to transmit, to a positioning entity, a request for positioning assistance data message, the request for positioning assistance data message identifying a serving cell of the UE and one or more neighboring cells of the UE with which the UE is attempting to perform a positioning procedure, and receive, from the positioning entity via the at least one transceiver, a positioning assistance data message in response to the request.

In an aspect, a positioning entity includes a memory, a communication device, and at least one processor communicatively coupled to the memory and the communication device, the at least one processor configured to: receive, from a UE via the communication device, a request for positioning assistance data message, the request for positioning assistance data message identifying a serving cell of the UE and one or more neighboring cells of the UE with which the UE is attempting to perform a positioning procedure, and cause the communication device to transmit, to the UE, a positioning assistance data message in response to the request.

In an aspect, a UE includes means for transmitting, to a positioning entity, a request for positioning assistance data message, the request for positioning assistance data message identifying a serving cell of the UE and one or more neighboring cells of the UE with which the UE is attempting to perform a positioning procedure, and means for receiving, from the positioning entity, a positioning assistance data message in response to the request.

In an aspect, a positioning entity includes means for receiving, from a UE, a request for positioning assistance data message, the request for positioning assistance data message identifying a serving cell of the UE and one or more neighboring cells of the UE with which the UE is attempting to perform a positioning procedure, and means for transmitting, to the UE, a positioning assistance data message in response to the request.

In an aspect, a non-transitory computer-readable medium storing computer-executable instructions includes computer-executable instructions comprising at least one instruction instructing a UE to transmit, to a positioning entity, a request for positioning assistance data message, the request for positioning assistance data message identifying a serving cell of the UE and one or more neighboring cells of the UE with which the UE is attempting to perform a positioning procedure, and at least one instruction instructing the UE to receive, from the positioning entity, a positioning assistance data message in response to the request.

In an aspect, a non-transitory computer-readable medium storing computer-executable instructions includes computer-executable instructions comprising at least one instruction instructing a positioning entity to receive, from a UE, a request for positioning assistance data message, the request for positioning assistance data message identifying a serving cell of the UE and one or more neighboring cells of the UE with which the UE is attempting to perform a positioning procedure, and at least one instruction instructing the positioning entity to transmit, to the UE, a positioning assistance data message in response to the request.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
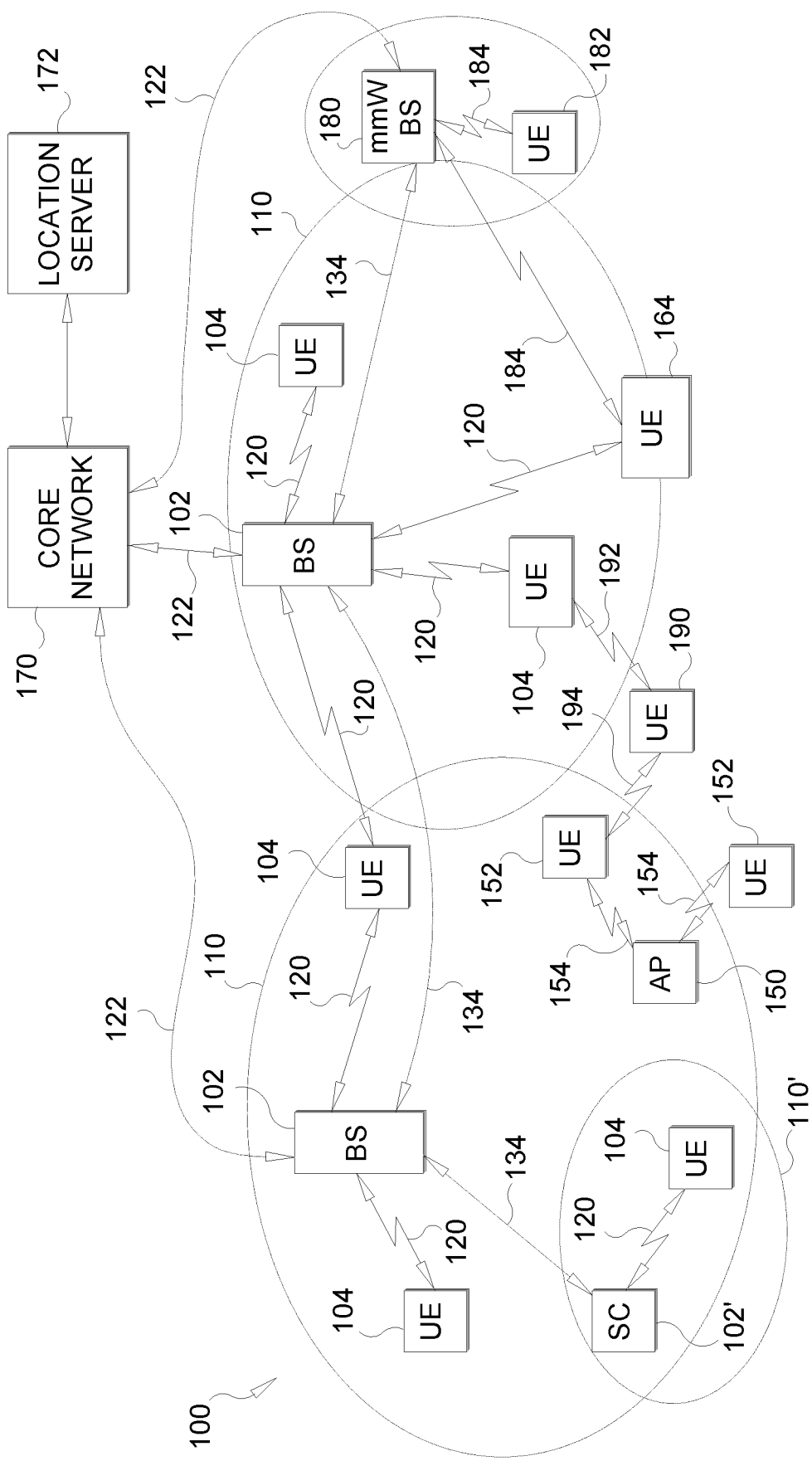
FIG. 1 illustrates an exemplary wireless communications system in accordance with one or more aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
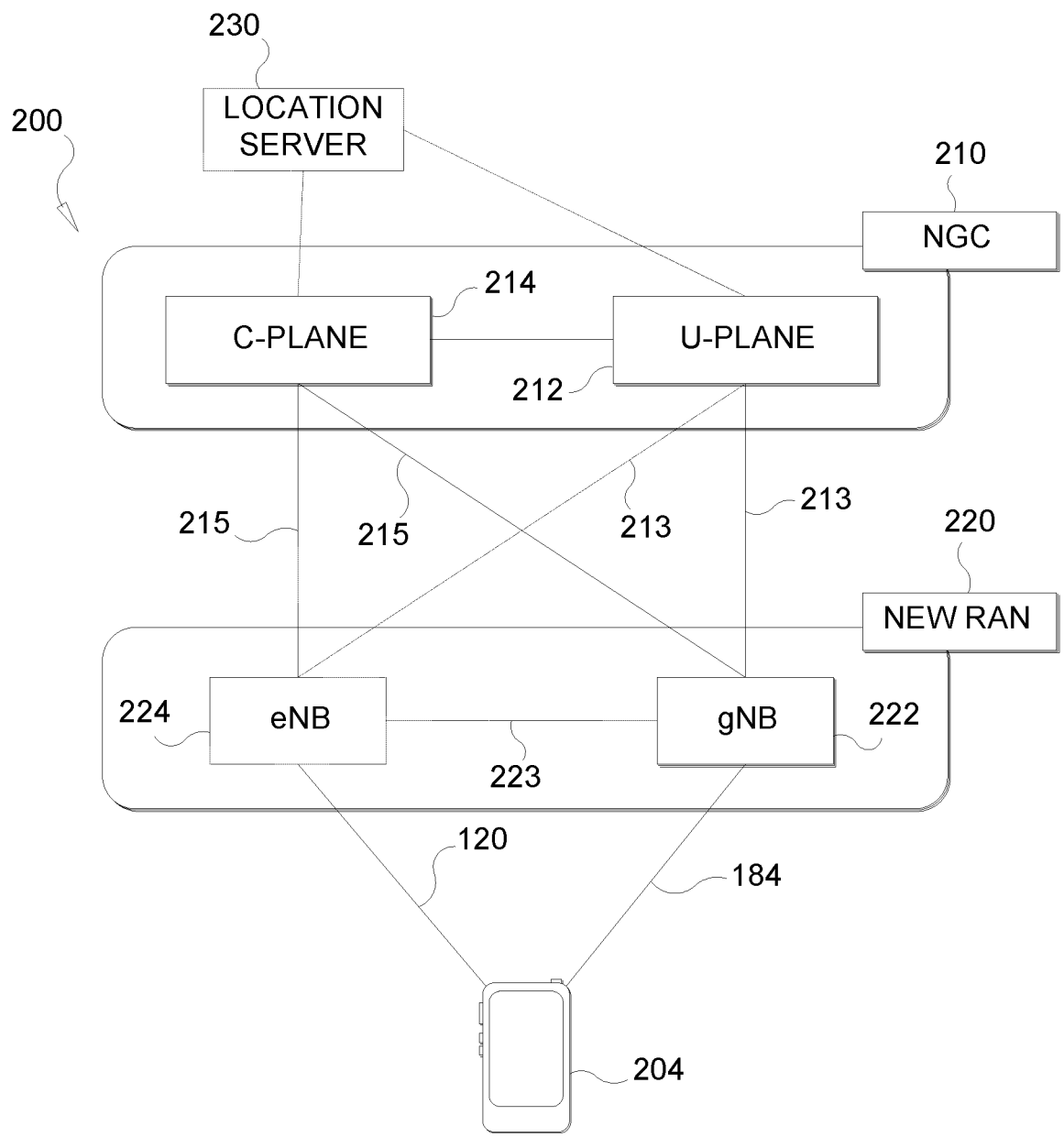
FIGS. 2A and 2B illustrate example wireless network structures in accordance with one or more aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. In an aspect, the location server 230 may be an evolved serving mobile location center (E-SMLC), a secure user plane location (SUPL) location platform (SLP), a gateway mobile location center (GMLC), a location management function (LMF), or the like. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
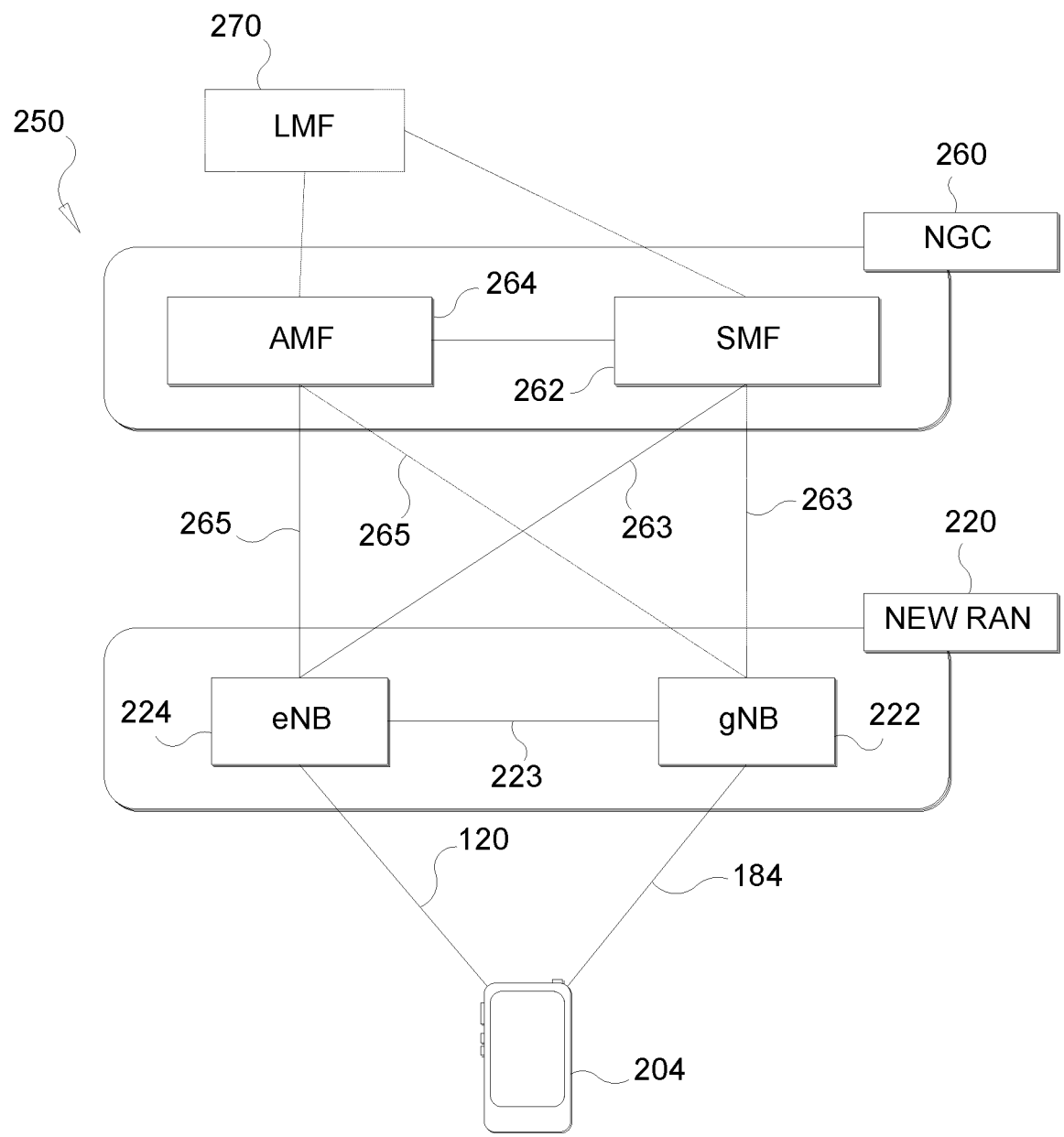

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the LMF 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
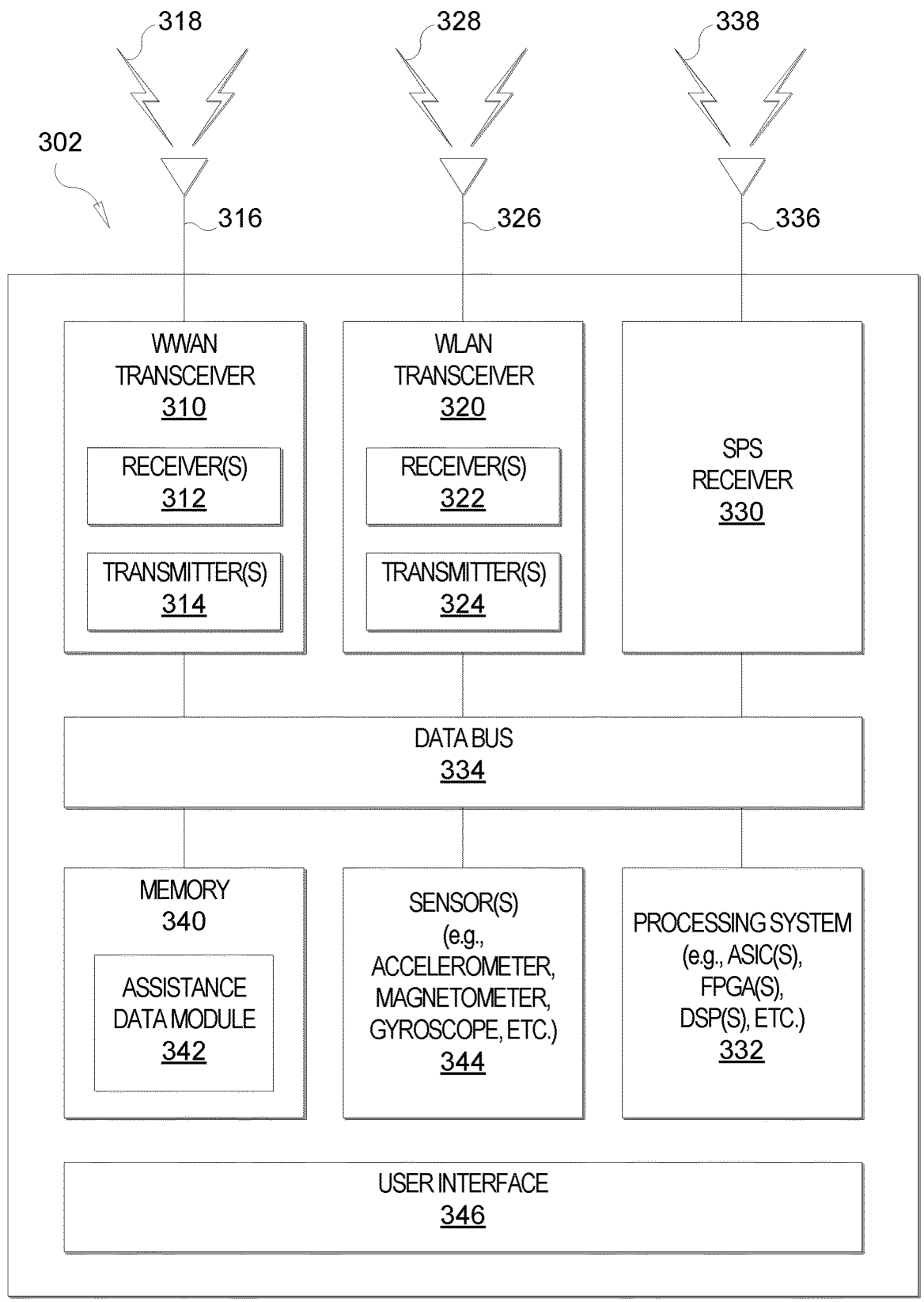
FIGS. 3A to 3C are simplified block diagrams of several sample aspects of components that may be employed in wireless communication nodes and configured to support communication as taught herein.
Figure 3B:
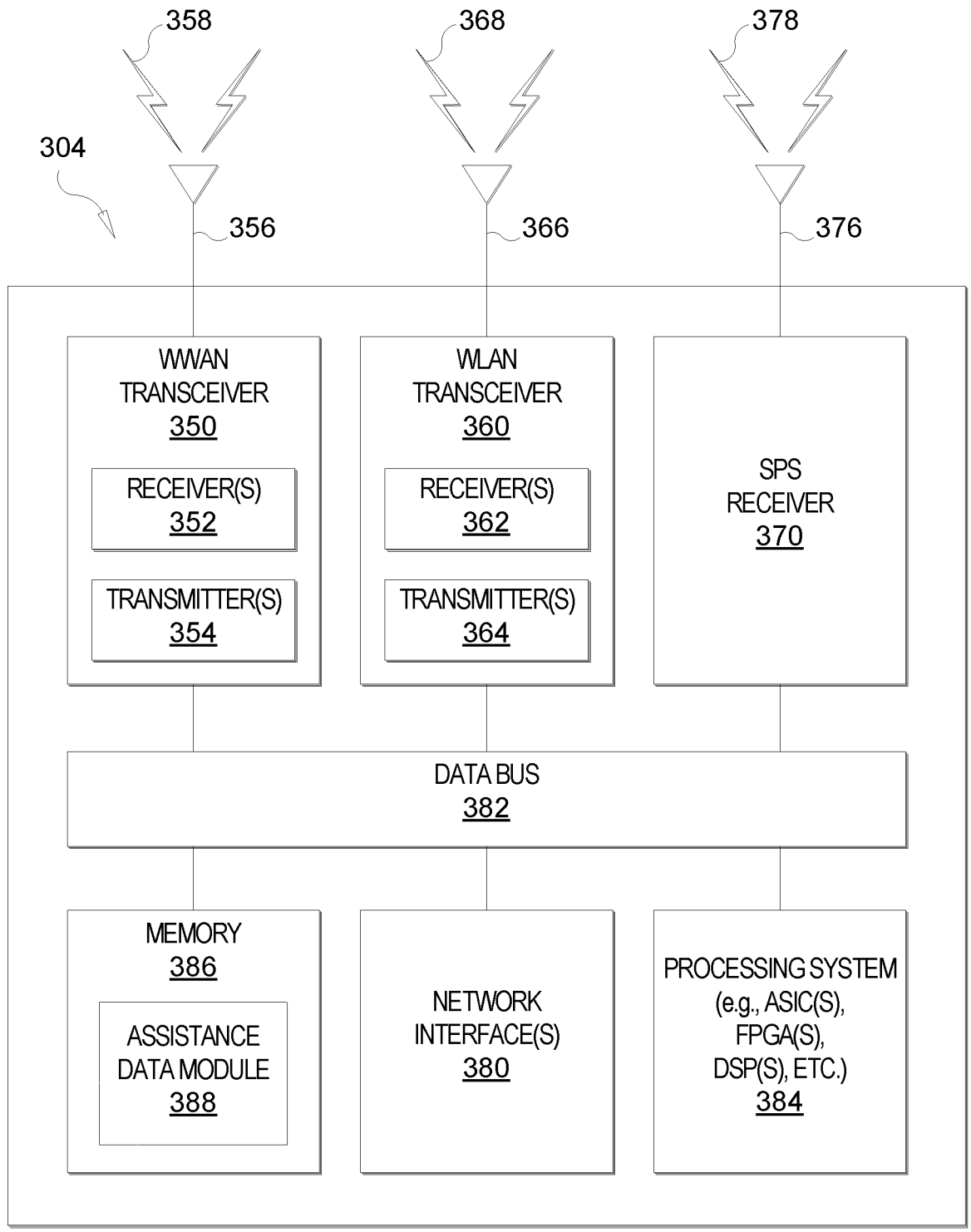
Figure 3C:
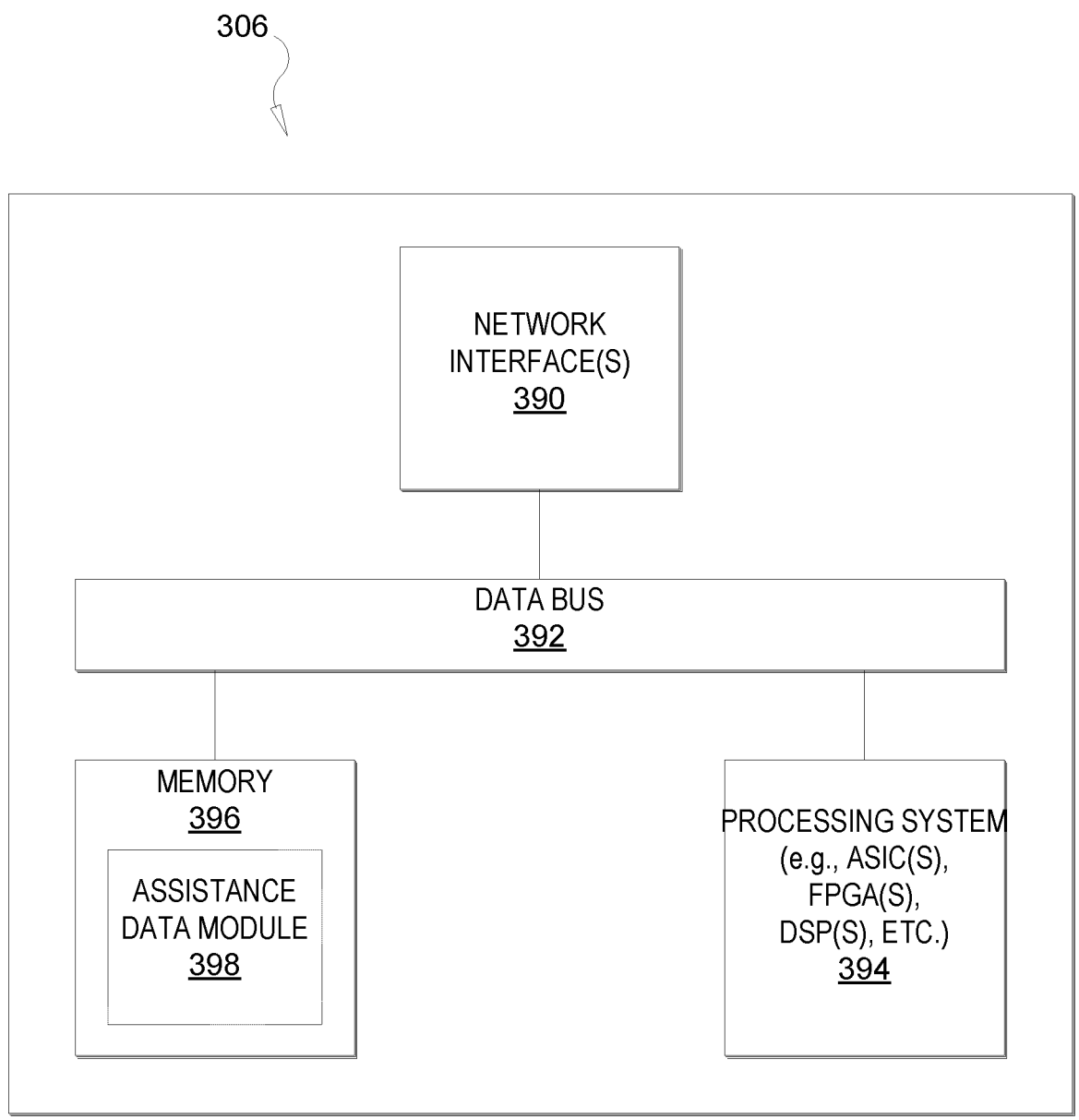

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include assistance data modules 342, 388, and 398, respectively. The assistance data modules 342, 388, and 398 may be hardware circuits that are part of or coupled to the processing systems 332, 384, and 394, respectively, that, when executed, cause the apparatuses 302, 304, and 306 to perform the functionality described herein. In other aspects, the assistance data modules 342, 388, and 398 may be external to the processing systems 332, 384, and 394 (e.g., part of a modem processing system, integrated with another processing system, etc.). Alternatively, the assistance data modules 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the assistance data modules 342, 388, and 398, etc.

A position estimate (e.g., for any of the UEs described herein) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

In LTE, in order to support determining the location of a UE, a location server (e.g., an E-SMLC, SLP, GMLC, etc.) may support one or more positioning protocols, such as LPP defined by 3GPP. A positioning protocol may be used between a UE and a location server to coordinate and control position determination for a UE. The positioning protocol may define: (a) positioning related procedures that may be executed by the location server and/or the UE; and/or (b) communication or signaling exchanged between the UE and the location server related to positioning of the UE. For control plane location, the location server (specifically, an E-SMLC) may use a positioning protocol, such as the LPP type A protocol (LPPa) defined by 3GPP, to obtain location related information for a UE from elements in the RAN (e.g., New RAN 220), such as any of eNBs 224. The location related information that is obtained may include location related measurements for the UE or other information to assist location of the UE, such as information on positioning reference signaling (PRS) signals transmitted by one or more of eNBs or location coordinates of one or more of eNBs. LPP is known in the art and described in various publicly available technical specifications (TSs) from 3GPP (e.g., 3GPP TS 36.355).

Figure 4:
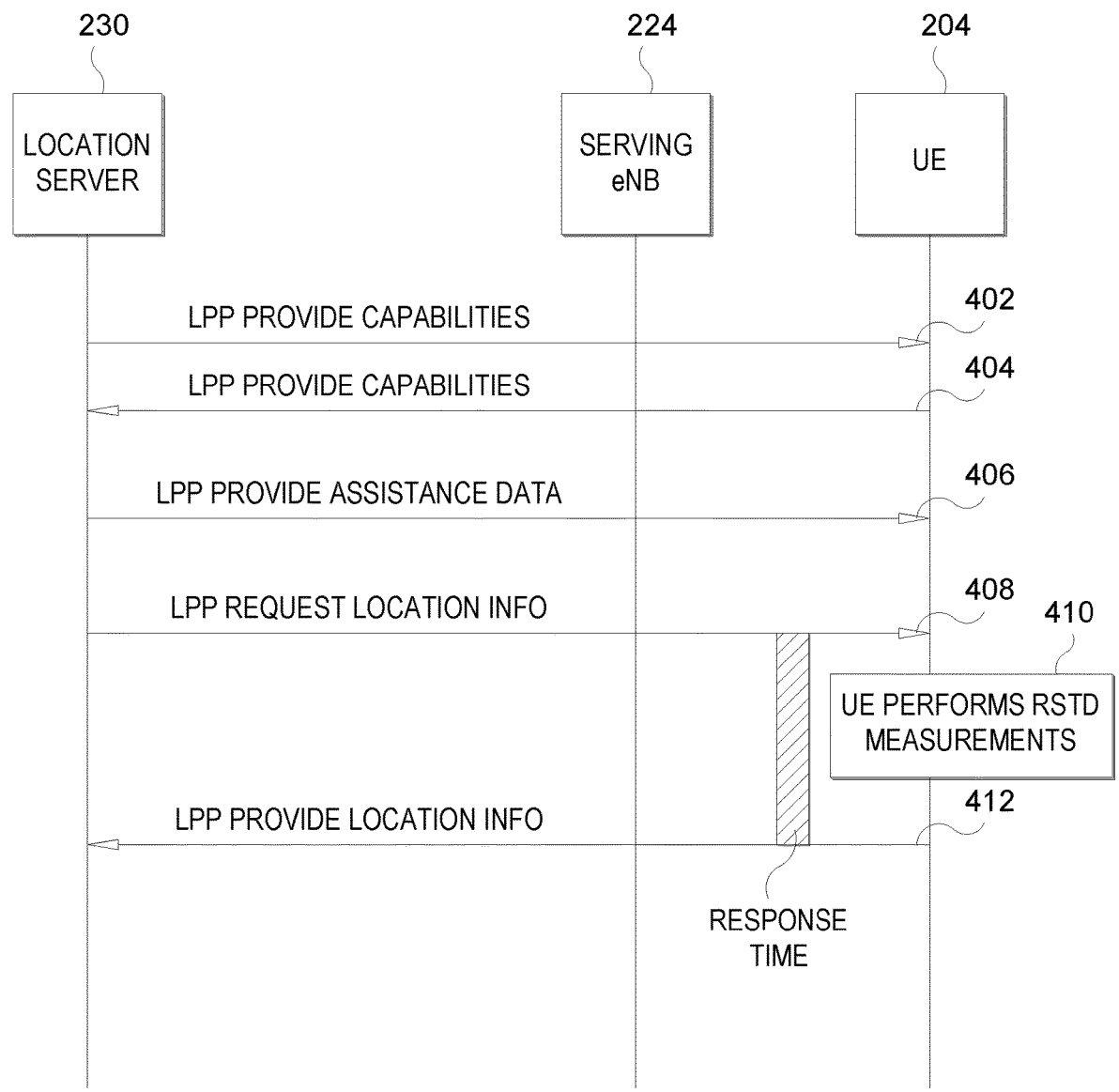
FIG. 4 illustrates a conventional LTE positioning protocol (LPP) call flow between the wireless mobile device and the location server for performing positioning operations.

FIG. 4 illustrates a conventional LPP call flow between a UE 204 and a location server 230 for performing positioning operations. As illustrated in FIG. 4, positioning of the UE 204 is supported via an exchange of LPP messages between the UE 204 and the location server 230 (e.g., an E-SMLC or SLP). The LPP messages may be exchanged between UE 204 and the location server 230 via an eNB 224 and a core network (e.g., via a mobility management entity (MME) with a control plane location solution when location server 230 comprises an E-SMLC or via packet data network gateway/serving gateway (P/SGW) with a user plane location solution when location server 230 comprises an SLP). For simplicity, only the eNB 224 is shown in FIG. 4. The procedure shown in FIG. 4 may be used to position the UE 204 in order to support various location-related services, such as navigation for UE 204 (or for the user of UE 204), or for routing, or for provision of an accurate location to a public safety answering point (PSAP) in association with an emergency call from UE 204 to a PSAP, or for some other reason.

Initially, the UE 204 may receive a request for its positioning capabilities from the location server 230 at stage 402 (e.g., an LPP Request Capabilities message). At stage 404, the UE 204 provides its positioning capabilities to the location server 230 relative to the LPP protocol by sending an LPP Provide Capabilities message to location server 230 indicating the position methods and features of these position methods that are supported by the UE 204 using LPP. The capabilities indicated in the LPP Provide Capabilities message may, in some aspects, indicate that the UE 204 supports OTDOA positioning and may indicate the capabilities of the UE 204 to support OTDOA. If OTDOA capabilities were requested in stage 402, this message includes information elements such as the OTDOA mode supported (note: LPP supports only a UE-assisted mode), supported frequency bands, and support for inter-frequency RSTD measurements.

Upon reception of the LPP Provide Capabilities message, the location server 230 determines to use the OTDOA position method based on the indicated UE 204 support for OTDOA at stage 404 and determines a reference cell and neighbor cells (or a reference cell set and/or neighbor cell sets) for OTDOA. At stage 406, the location server 230 then sends an LPP Provide Assistance Data message to the UE 204. The OTDOA assistance data includes assistance for the reference cell and up to 72 neighbor cells. If the UE 204 indicated support for inter-frequency RSTD measurements, the neighbor cell assistance data may be provided for up to three frequency layers.

In some implementations, the LPP Provide Assistance Data message at stage 406 may be sent by the location server 230 to the UE 204 in response to an LPP Request Assistance Data message sent by the UE 204 to the location server 230 (not shown in FIG. 4). An LPP Request Assistance Data message may include an identifier of the UE's 204 serving cell and a request for the PRS configuration of neighboring cells.

The LPP Provide Assistance Data message may include positioning assistance data in the form of OTDOA assistance data to enable or to help enable the UE 204 to obtain and return OTDOA RSTD measurements, and may include information for the reference cell (or reference cell set) identified at stage 406 (e.g., corresponding to one of eNBs 224). The information for the reference cell (or reference cell set) may include a global ID for the reference cell (or a global ID for each cell in a reference cell set), a physical cell ID for the reference cell (or a physical cell ID for each cell in reference cell set), carrier frequency information, and PRS configuration parameters for the reference cell (or reference cell set).

The LPP Provide Assistance Data message may also include OTDOA assistance data for neighbor cells (and/or neighbor cell sets) identified at stage 406 (e.g., corresponding to other eNBs 224). The information provided for each neighbor cell (and/or each neighbor cell set) in the LPP Provide Assistance Data message may be similar to that provided for the reference cell (e.g., may include a cell ID, cell frequency, and PRS configuration parameters) and may further include, for example, a slot number and/or subframe offset between the neighbor cell (or neighbor cell set) and the reference cell (or reference cell set), and/or an expected approximate RSTD value and RSTD uncertainty.

At stage 408, the location server 230 sends a request for location information to the UE 204. The request may be an LPP Request Location Information message. This message usually includes information elements such as location information type, desired accuracy of the location estimate, and response time. Note that in some implementations, the LPP Provide Assistance Data message sent at stage 406 may be sent after the LPP Request Location Information message at 408 if, for example, the UE 204 sends a request for assistance data to location server 230 (e.g., in an LPP Request Assistance Data message, not shown in FIG. 4) after receiving the request for location information at stage 408. The request for location information sent at stage 408 may request the UE 204 to obtain RSTD measurements for OTDOA in, for example, association with the information for the reference cell (or reference cell set) and neighbor cells (and/or neighbor cell sets) sent to UE 204 at stage 406.

At stage 410, the UE 204 utilizes the OTDOA positioning assistance information received at stage 406 and any additional data (e.g., a desired location accuracy or a maximum response time) received at stage 408 to perform RSTD measurements for the OTDOA positioning method. The RSTD measurements may be made between the reference cell (set) indicated at stage 406, or a reference cell (or reference cell set) determined by the UE 204 from the neighbor cells (and/or neighbor cell sets) indicated at stage 406, and one or more of the (other) neighbor cells (and/or neighbor cell sets) indicated at stage 406. The UE 204 utilizes the PRS configuration parameters for the reference and neighbor cells (and/or cell sets) provided at stage 406 to acquire and measure PRS signals for these cells (and/or cell sets) in order to obtain RSTD measurements.

At stage 412, the UE 204 may send an LPP Provide Location Information message to the location server 230 conveying the RSTD measurements that were obtained at stage 410 and before or when any maximum response time has expired (e.g., a maximum response time provided by the location server 230 at stage 408). The LPP Provide Location Information message at stage 412 may include the time (or times) at which the RSTD measurements were obtained and the identity of the reference cell (or an identity of one cell in a reference cell set) for the RSTD measurements (e.g., the reference cell ID and carrier frequency). The message at stage 412 may also include a neighbor cell measurement list including, for each measured neighbor cell (and/or for each measured neighbor cell set), the identity of the cell or of one cell in a cell set (e.g., the physical cell ID, global cell ID, and/or cell carrier frequency), the RSTD measurement for the cell (or cell set), and the quality of the RSTD measurement for the cell (or cell set) (e.g., the expected error in the RSTD measurements). The neighbor cell measurement list may include RSTD data for one or more cells. Note that the time between the request for location information at 408 and the response at 412 is the "response time."

The location server 230 computes an estimated location of the UE 204 using OTDOA positioning techniques based, at least in part, on measurements received in the LPP Provide Location Information message at stage 412 (e.g., RSTD measurements).

In LTE, the entity requesting a position fix is generally the UE 204 (e.g., a location service running on the UE 204) or an emergency call center (e.g., a PSAP), and the positioning entity is generally the location server 230 (e.g., an E-SMLC). In contrast, with NR, the requester of the position fix and the engine computing the position fix may be at other locations as compared to LTE. More specifically, while the requester in NR may still be the UE 204 and the positioning entity may still be the location server 230, there are other possibilities. For example, the positioning entity (e.g., an LMF) may be located at a gNB 222 or in the UE 204 itself, rather than on a remote server. As another example, the requester may be a gNB 222, such as in factory automation, vehicle-to-everything (V2X), augmented reality (AR), and virtual reality (VR) use-cases, as opposed to the UE in LTE. As such, there is a need for more flexibility in the assistance data formats and procedures in NR to handle these different use cases.

Accordingly, the present disclosure provides various positioning assistance data procedures for NR. In an aspect, a UE 204 can request information for specific gNBs 222 or other TRPs.

Figure 5A:
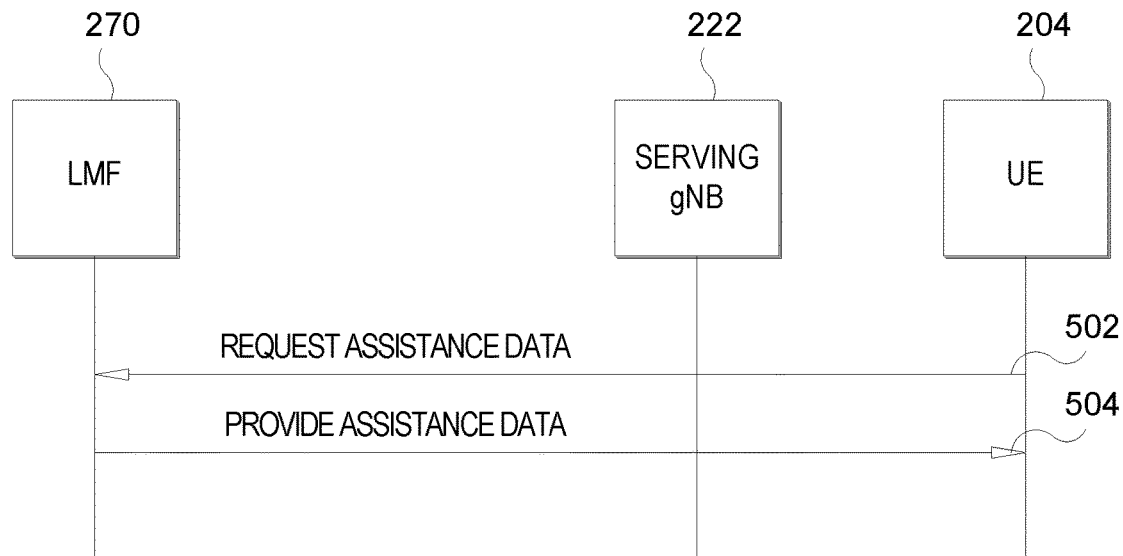
FIGS. 5A and 5B illustrate exemplary call flows between a UE and a location management function (LMF) for performing positioning operations, according to aspects of the disclosure.
Figure 5B:
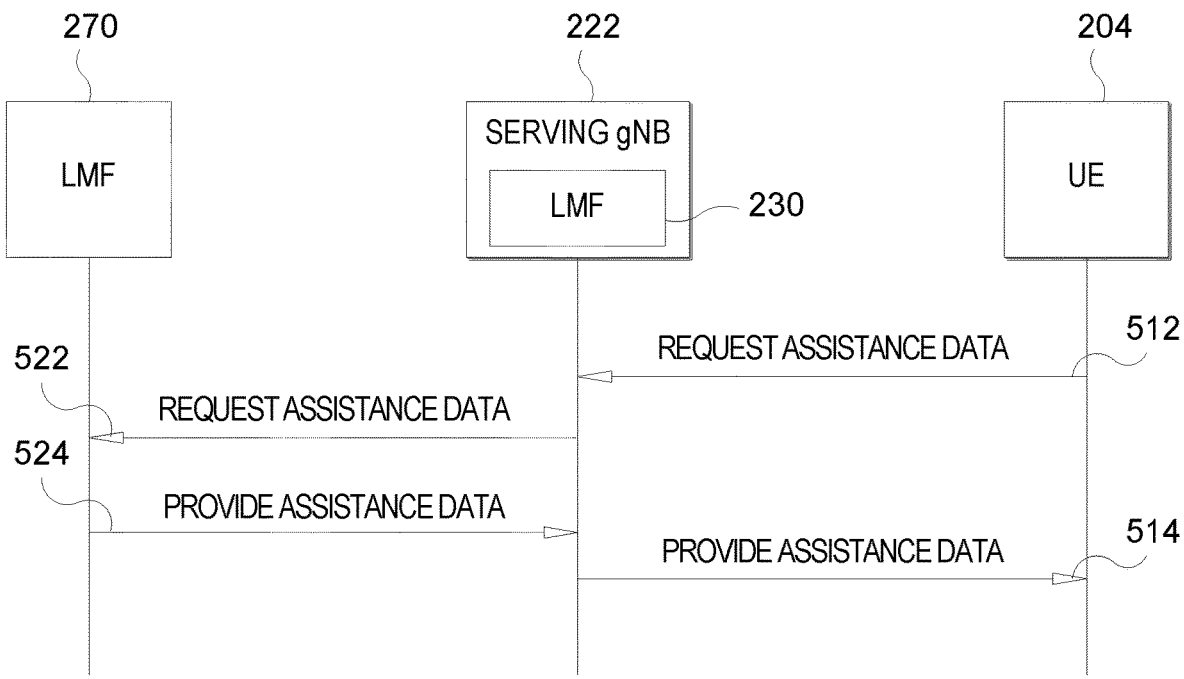

FIGS. 5A and 5B illustrate exemplary call flows between a UE 204 and an LMF 270 for performing positioning operations, according to aspects of the disclosure. At 502, the UE 204 sends a Request Assistance Data message to the LMF 270 via the serving cell/serving gNB 222. In LTE, a UE 204 can indicate (identify) its current serving cell when requesting PRS configuration in an LPP Request Assistance Data message. In the present disclosure, if the UE 204 is connected to an NR network (as in the example of FIG. 5A), in addition to identifying the current serving cell, the Request Assistance Data message can also indicate (identify) neighbor cells and/or neighbor TRPs of the UE 204 and their signal strengths, which could be measured on the synchronization signal block (SSB), or channel state information reference signal (CSI-RS), or PRS if configured.

The disclosed Request Assistance Data message transmitted/received at 502 may also include a request for PRS (or other positioning reference signaling) from particular neighbor cells and/or TRPs, and/or a request for base station almanac (BSA) information on particular neighbor cells and/or TRPs. The base station almanac information for a given neighbor cell/TRP may include the geographic location of the antennas/antenna arrays of the corresponding gNB/TRP, the orientation, tilt, and height of the antennas/antenna arrays, and/or the antenna/antenna array and beam patterns. The base station almanac information may also include the extent to which the neighbor cell/TRP is synchronized with the serving cell (to assist with OTDOA and/or uplink time difference of arrival (UTDOA)), and/or the extent to which the neighbor cell/TRP group-delay is calibrated (to assist with multi-RTT).

At 504, the LMF 270 can reply with a Provide Assistance Data message containing the requested information for the identified cells/TRPs. The cells/TRPs may be identified by an identifier or by an index value corresponding to their position in the Request Assistance Data message transmitted/received at 502. For example, the cells/TRPs may be identified by their PCI, enhanced cell identifier (E-CID), VCI, etc., or simply some identifier known to the LMF 270 and the UE 204. In addition to the request information, the LMF 270 can instruct the neighboring cells/TRPs to transmit positioning reference signals (e.g., PRS) to the UE 204 according to the configuration sent to the UE 204 in the Provide Assistance Data message.

In an aspect, the Request Assistance Data message may be sent to the LMF 270 via the serving gNB 222, as illustrated in FIG. 5A. However, where the LMF 270 is part of the serving gNB 222, the Request Assistance Data message may be sent directly to the serving gNB 222, as illustrated in FIG. 5B at stage 512, and processed by the LMF 270 at the serving gNB 222. In that case, the serving gNB 222 sends the Provide Assistance Data message containing the requested information for the identified cells at 514.

Alternatively, where the LMF 270 is not part of the serving gNB 222, rather than simply forward the Request Assistance Data message received at 512 to the LMF 270, as in FIG. 5A, the serving gNB 222 may decode the Request Assistance Data message and forward it to the LMF 270 (e.g., via the NR Positioning Protocol type A (NRPPa)) at 522. The serving gNB 222 would then receive the Provide Assistance Data message from the LMF 270 at stage 524 and forward it to the UE 204 at stage 514. As is known in the art, NRPPa specifies the control plane radio network layer signaling procedures between a gNB 222 and the LMF 270. The NRPPa Location Information Transfer Procedures module contains procedures used to handle the transfer of positioning related information between New RAN nodes (e.g., gNBs 222) and the LMF 270. NRPPa is described in various publicly available technical specifications (TSs) from 3GPP (e.g., 3GPP TS 38.455). This approach allows the gNB 222 to combine Request Assistance Data messages from multiple requesting UEs 204 into a single message to the LMF 270, for example, eliminating duplicate requests if multiple UEs 204 have exactly the same request or request type. This can reduce traffic in the core network, which may be especially important in scenarios such as factory automation with large number of UEs 204 needing positioning.

In an aspect, the call flows illustrated in FIGS. 5A and 5B may replace the LPP Provide Assistance Data stage at 406 of FIG. 4. Thus, although not shown in FIGS. 5A and 5B, the illustrated positioning method may begin with an exchange of capability messages between the UE 204 and the LMF 270, similar to stages 402 and 404 of FIG. 4, and may continue with the LMF 270 sending a Request Location Information message to the UE 204 and the UE 204 responding with a Provide Location Information message, as described above with reference to stages 408 to 412 of FIG. 4, but using the new information exchanged at 502 and 504 or 512 and 514.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS in 5G, TRS, CRS, CSI-RS, SRS, etc.

Figure 6:
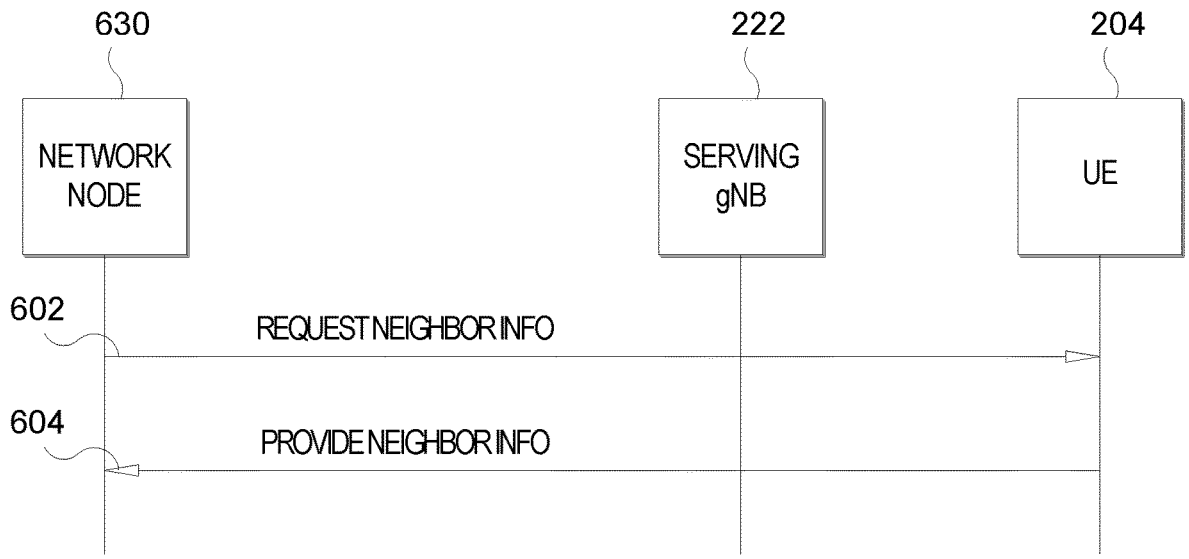
FIG. 6 illustrates an exemplary call flow between a UE and a network node for performing positioning operations, according to aspects of the disclosure.

FIG. 6 illustrates an exemplary call flow between a UE 204 and a network node 630 for performing positioning operations, according to aspects of the disclosure. The network node 630 may be a non-serving gNB 222, an LMF 270, a location server 230, an emergency call center (e.g., a PSAP), or the like. As illustrated in FIG. 6, instead of the UE 204 initiating positioning operations, as in FIGS. 5A and 5B, the network node 630 may initiate positioning operations.

Specifically, at 602, the network node 630 queries the UE 204 for neighbor cell information. The network node 630 may tunnel the query through the serving gNB 222, or may send the query to the serving gNB 222, which may relay it to the UE 204. At 604, the UE 204 can then report the same information to the network node 630 that was described above with reference to stage 502 of FIG. 5A. The UE 204 may simply reply to the query with the requested information, or add its own requests in addition (e.g., a request for positioning reference signaling from particular neighbor cells and/or TRPs, and/or a request for base station almanac information on particular neighbor cells and/or TRPs).

The call flow illustrated in FIG. 6 may replace the Request Assistance Data messages at 502 of FIG. 5A. Thus, although not shown in FIG. 6, the illustrated positioning method may begin with an exchange of capability messages, similar to stages 402 and 404 of FIG. 4, and may continue with the network node 630 sending Provide Assistance Data and Request Location Information messages to the UE 204 and the UE 204 responding with a Provide Location Information message, as described above with reference to stages 406 to 412 of FIG. 4 and 504 of FIG. 5A, but using the new information exchanged at 604.

LPP was designed for communication between the location server (e.g., an E-SMLC) and a UE 204. Specifically, the LPP messages illustrated in FIG. 4 are routed through the UE's 204 serving eNB 224 in RRC messages carrying NAS containers that the serving eNB 224 cannot read. However, in NR, the LMF 270 may be co-located with the serving gNB 222, raising potential issues.

Figure 7:
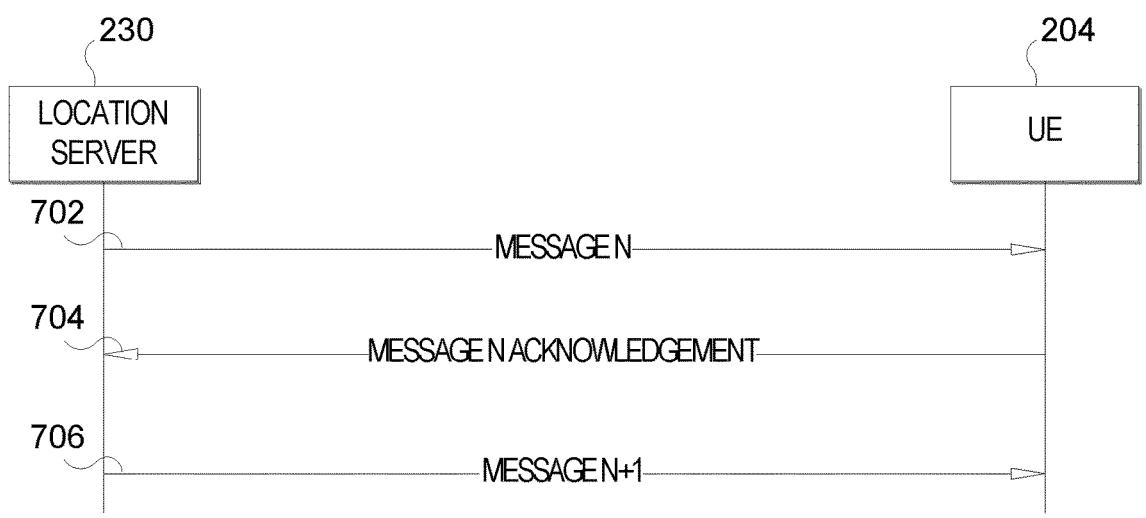
FIG. 7 illustrates a conventional LPP acknowledgment call flow between a UE and a location server.

FIG. 7 illustrates a conventional LPP acknowledgment call flow between a UE 204 and a location server 230. Each LPP message illustrated in FIG. 4 may carry an acknowledgement request and/or an acknowledgement indicator. An LPP message that includes an acknowledgement request also includes a sequence number. Upon reception of an LPP message that includes an acknowledgment request, the receiver returns an LPP message with an acknowledgement response for the sequence number of the message being acknowledged. An acknowledgement response may contain no LPP message body (in which case only the sequence number being acknowledged is significant). Alternatively, the acknowledgement may be sent in an LPP message along with an LPP message body. An acknowledgement is returned for each received LPP message that requested an acknowledgement including any duplicate(s). Once a sender receives an acknowledgement for an LPP message, and provided any included sequence number is matching, it is permitted to send the next LPP message. No message reordering is needed at the receiver since this stop-and-wait method of sending ensures that messages normally arrive in the correct order.

Thus, as illustrated in FIG. 7, at 702, the location server 230 sends an LPP message N (e.g., any of the LPP messages sent by the location server 230 in FIG. 4) having a sequence number. At 704, if LPP message N is received and the UE 204 is able to decode it, the UE 204 returns an acknowledgement for message N. The acknowledgement contains an indicator set to the same sequence number as that in message N. At 706, when the acknowledgement for LPP message N is received and the included sequence indicator matches the sequence number sent in message N, the location server 230 sends the next LPP message N+1 (e.g., any subsequent LPP messages sent by the location server 230 in FIG. 4) to the UE 204 when this message is available.

When an LPP message that requested acknowledgement is sent and not acknowledged, it is resent by the sender following a timeout period up to three times. If still unacknowledged after that, the sender aborts all LPP activity for the associated session. The timeout period is determined by the sender implementation. The above LPP acknowledgment procedure is known in the art and described in various publicly available technical specifications from 3GPP (e.g., 3GPP TS 36.355).

Figure 8:
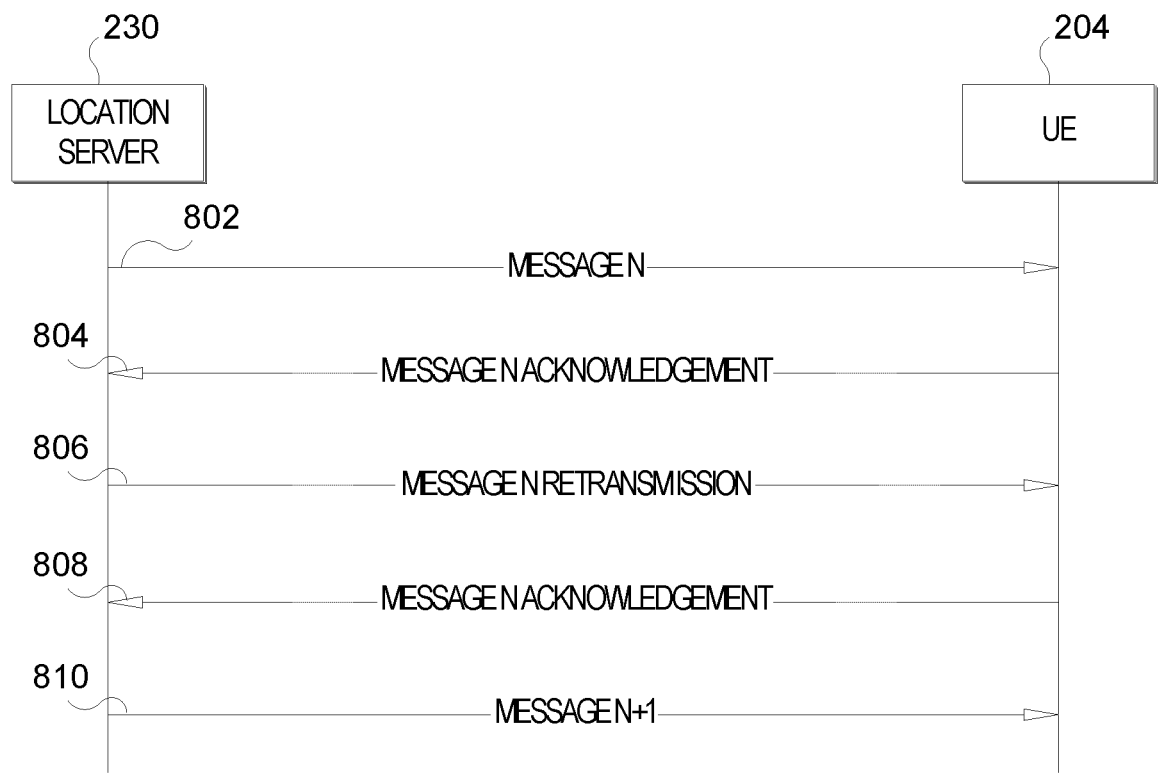
FIG. 8 illustrates a conventional LPP retransmission call flow between a UE and a location server.

FIG. 8 illustrates a conventional LPP retransmission call flow between a UE 204 and a location server 230. At 802, the location server 230 sends an LPP message N (e.g., any of the LPP messages sent by the location server 230 in FIG. 4) to the UE 204 for a particular location session and includes a request for acknowledgement along with a sequence number.

At 804, if LPP message N is received and the UE 204 is able to determine that an acknowledgement is requested and to decode the sequence number (regardless of whether the message body can be correctly decoded), the UE 204 returns an acknowledgement for message N. If the acknowledgement is received at the location server 230 (such that the acknowledged message can be identified and the sequence numbers are matching), the location server 230 skips stages 806 and 808.

However, at 806, if the acknowledgement from stage 804 is not received after a timeout period, the location server 230 retransmits LPP message N and includes the same sequence number as in stage 802.

At 808, if LPP message N in stage 806 is received and the UE 204 is able to decode the acknowledgment request and the sequence number (regardless of whether the message body can be correctly decoded and whether or not the message is considered a duplicate), the UE 204 returns an acknowledgement. Stage 806 may be repeated one or more times if the acknowledgement in stage 808 is not received after a timeout period by the location server 230. If the acknowledgement in stage 808 is still not received after sending three retransmissions, the location server 230 aborts all procedures and activity associated with LPP support for the particular location session.

At 810, once an acknowledgement in stage 804 or 808 is received, the location server 230 sends the next LPP message N+1 for the location session to the UE 204 when this message is available. The above LPP retransmission procedure is known in the art and described in various publicly available technical specifications from 3GPP (e.g., 3GPP TS 36.355).

In the present disclosure, in an aspect, if the LMF 270 is co-located with the serving gNB 222, the LMF 270 may still be a distinct software entity (such as a location measurement unit (LMU)) within the gNB 222, and as such, the same type of protocol as with LPP could be used. That is, the messages between the UE 204 and the LMF 270 could be tunneled through the gNB 222 without the gNB 222 being able to decode them. In a variation of this approach, LPP messages can be used with their "acknowledgment request" field either set to "not requested" or omitted altogether with the understanding that omission implies that acknowledgment is not requested. Further, the choice among the above alternatives may be dependent on whether the gNB 222 with the integrated LMF 270 is a serving cell of the UE 204, or in particular, whether it is a primary serving cell of the UE 204. Omission of the "acknowledgment request" field may save on some signaling overhead, because the gNB 222 and the UE 204 may have other independent means to confirm whether they received each other's LPP messages, for example, HARQ and/or RLC acknowledgments when the gNB 222 is a serving cell.

Alternatively, for lower latency, the LMF 270 may be tightly integrated into the gNB 222. In that case, the use of an LPP-type protocol (like the LPP procedures described above with reference to FIGS. 7 and 8) may cause extra overhead and latency. To address this issue, the techniques disclosed herein allow a mode in which direct RRC signaling between the serving gNB 222 and the UE 204 is used instead of an LPP-type protocol between the UE 204 and the LMF 270 or location server 230. For example, the LMF 270 and the UE 204 can use RRC with acknowledged mode as a replacement for the LPP acknowledgment and retransmission schemes described above with reference to FIGS. 6 and 7.

Figure 9:
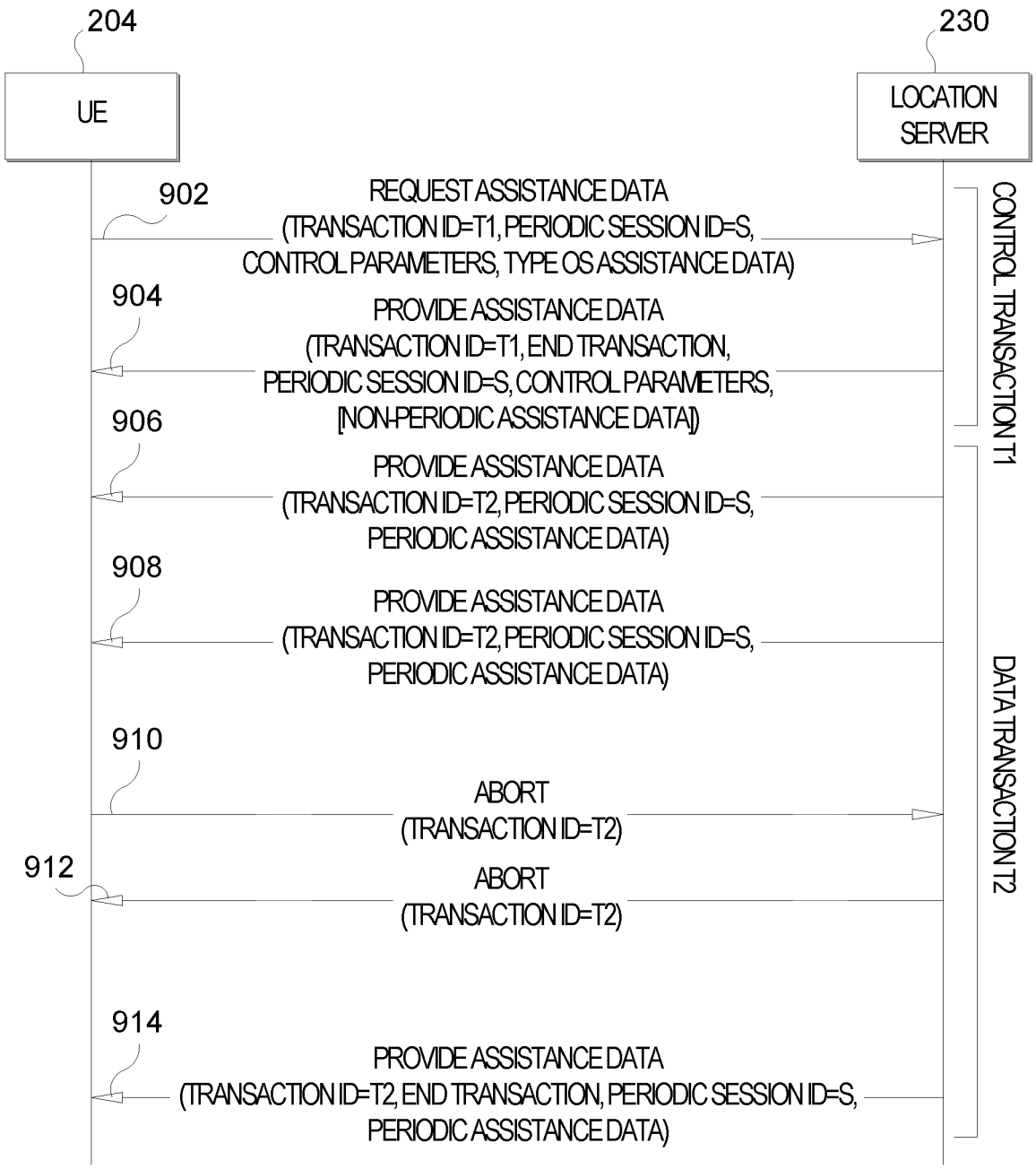
FIG. 9 illustrates a conventional LPP periodic assistance data transfer call flow between a UE and a location server.

Currently, LPP allows for aperiodic and periodic assistance data transmission, which may be solicited by request, or unsolicited. FIG. 9 illustrates a conventional LPP periodic assistance data transfer call flow between a UE 204 and a location server 230. This procedure enables a target UE 204 to request a location server 230 to send assistance data periodically. At 902, the UE 204 sends a Request Assistance Data message to the location server 230 using transaction ID "T1." The message contains a periodic session ID "S" (different from any other periodic session ID currently in use between the UE 204 and the location server 230). The message also includes a positioning method specific assistance data request element identifying the type of assistance data being requested together with the desired periodicity conditions for sending it and a duration for ending the assistance data transfer.

At 904, the location server 230 responds with a Provide Assistance Data message to the UE 204. The Provide Assistance Data message uses the transaction ID "T1" from stage 902 and indicates the end of this transaction. The message contains the periodic session ID "S." If the request can be supported, the message contains the control parameters in the positioning method specific assistance data, which may confirm or redefine the type of assistance data or periodicity parameters requested at stage 902. If the UE 204 requested non-periodic assistance data in addition to the periodic assistance data in stage 902, the Provide Assistance Data message may also include the non-periodic assistance data (but not any periodic assistance data).

If the request cannot be supported (either fully or partly), an error reason is provided. If the request cannot even partly be supported, the remaining stages are not performed. Note that the UE 204 infers from an absence of the periodic session ID that the location server 230 does not support periodic assistance data delivery. In that case, the UE 204 does not expect the subsequent data transaction (stages 906 to 914).

At 906, when the first periodic message is available, the location server 230 sends an unsolicited Provide Assistance Data message to the UE 204 containing the periodic Session ID "S" and the periodic assistance data confirmed in stage 904. The message uses some available transaction ID "T2" that may be different from "T1."

At 908, the location server 230 may continue to send further Provide Assistance Data messages to the UE 204 containing the periodic assistance data confirmed or redefined in stage 904 when each additional periodicity condition occurs. Note that the UE 204 expects a Provide Assistance Data messages as in stage 904 at confirmed interval(s). If some or all of the assistance data is not available at each periodic interval, an error indication is provided.

At 910, if the UE 204 desires the session to end, the UE 204 sends an Abort message to the location server 230 for transaction "T2" that may optionally include an abort cause. The remaining stages are then omitted.

At 912, if the location server 230 desires the session to end, the location server 230 sends an Abort message to the UE 204 for transaction "T2" that may optionally include an abort Cause. The remaining stages are then omitted.

At 914, when the duration or other conditions for ending the periodic assistance data transfer occur, the last Provide Assistance Data message transferred indicates the end of transaction "T2."

An assistance data delivery procedure is also defined for LPP and allows the location server 230 to provide unsolicited assistance data to the UE 204. Specifically, the location server 230 sends a Provide Assistance Data message to the target UE 204 containing assistance data. If there are no subsequent messages to send, this message indicates that it is the last message of the transaction. However, if there will be subsequent messages, the location server 230 may transmit one or more additional Provide Assistance Data messages to the target UE 204 containing additional assistance data. The last such message indicates that it is the last message of the transaction. The LPP periodic assistance data transfer procedure illustrated in FIG. 9 and the periodic assistance data delivery procedure described above are known in the art and described in various publicly available technical specifications from 3GPP (e.g., 3GPP TS 36.355).

In NR, there are occasional situations where assistance data should be updated, but these situations do not occur at a regular periodicity. Rather, these updates may be based on various event triggers, such as a reconfiguration of transmit beams, a mechanical control/change of antenna tilt and/or height, and the like. They may also be caused by multiple other factors, such as network loading, inter-cell interference coordination, etc. Currently, as described above with reference to FIG. 9, assistance data is expected to be received at each periodic interval. If not, an error message is expected corresponding to an assistance data message if the data to generate that assistance data message was not available in time. However, this periodic reporting of assistance data is not necessary in NR given the aperiodic nature of the above-mentioned event triggers.

Accordingly, the present disclosure provides techniques to allow a configurable period for sending assistance data messages to the UE 204. Specifically, each report of assistance data may have a validity timer, and the next report would be expected at the end of the timer.

Figure 10:
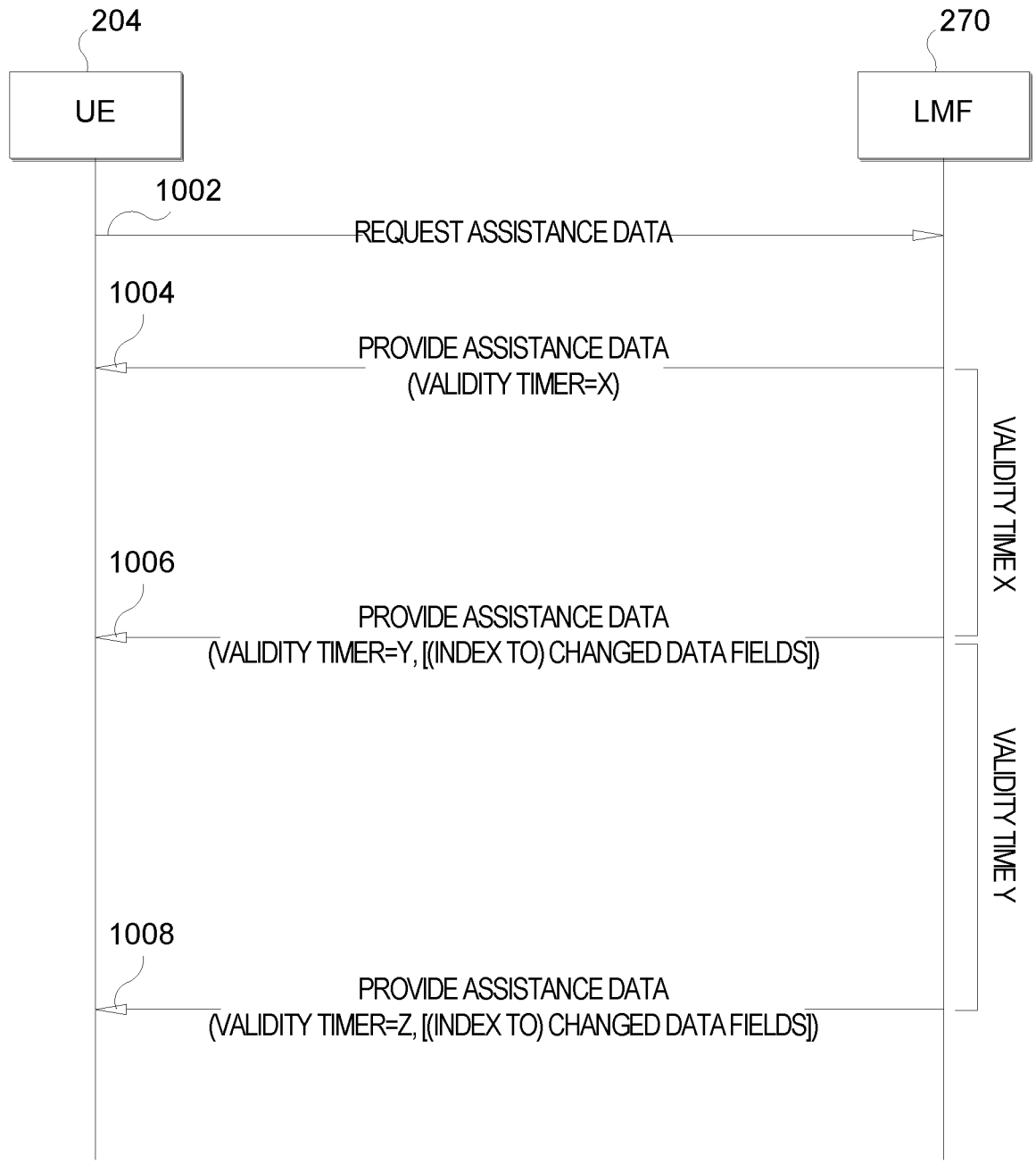
FIG. 10 illustrates an exemplary method of providing assistance data from an LMF to a UE, according to aspects of the disclosure.

FIG. 10 illustrates an exemplary method of providing assistance data from an LMF 270 to a UE 204, according to aspects of the disclosure. At 1002, the UE 204 begins an assistance data session by sending a Request Assistance Data message to the LMF 270, similar to 902 of FIG. 9. At 1004, the LMF 270 responds with a Provide Assistance Data message to the UE 204, similar to 904 of FIG. 9. The Provide Assistance Data message may include a validity timer specifying a validity time period "X" during which the information in the Provide Assistance Data message sent at 1004 will be valid. Based on the validity timer, the UE 204 will not expect another Provide Assistance Data message until the end of the validity time period "X."

At 1006, at the end of the validity time period "X," the LMF 270 sends another Provide Assistance Data message, this one including a validity time period "Y" during which the information in the Provide Assistance Data message sent at 1006 will be valid. Provide Assistance Data messages may have a large set of fields, and only a small subset may have changed from the previous Provide Assistance Data message. If all fields are optional, then only the fields that have new values need to be sent. However, if there are mandatory fields that did not change, and are thus redundant, this can create unnecessary overhead and latency. To address this, the present disclosure allows the LMF 270 to configure a set of possible combinations of values of the fields that are expected to change. Each new Provide Assistance Data message need only indicate an index into this set. This set may be reconfigured and is valid for the duration of the current irregularly-periodic assistance data session.

At 1008, at the end of the validity time period "Y," the LMF 270 sends another Provide Assistance Data message, this one including a validity time period "Z" during which the information in the Provide Assistance Data message sent at 1008 will be valid. These irregularly-periodic Provide Assistance Data messages continue until either the UE 204 or the LMF 270 sends an Abort message, as at 910 and 912 of FIG. 9. When the duration or other conditions for ending the irregularly-periodic assistance data delivery session occur, the last Provide Assistance Data message transferred indicates the end of session, as at 914 of FIG. 9.

Figure 11:
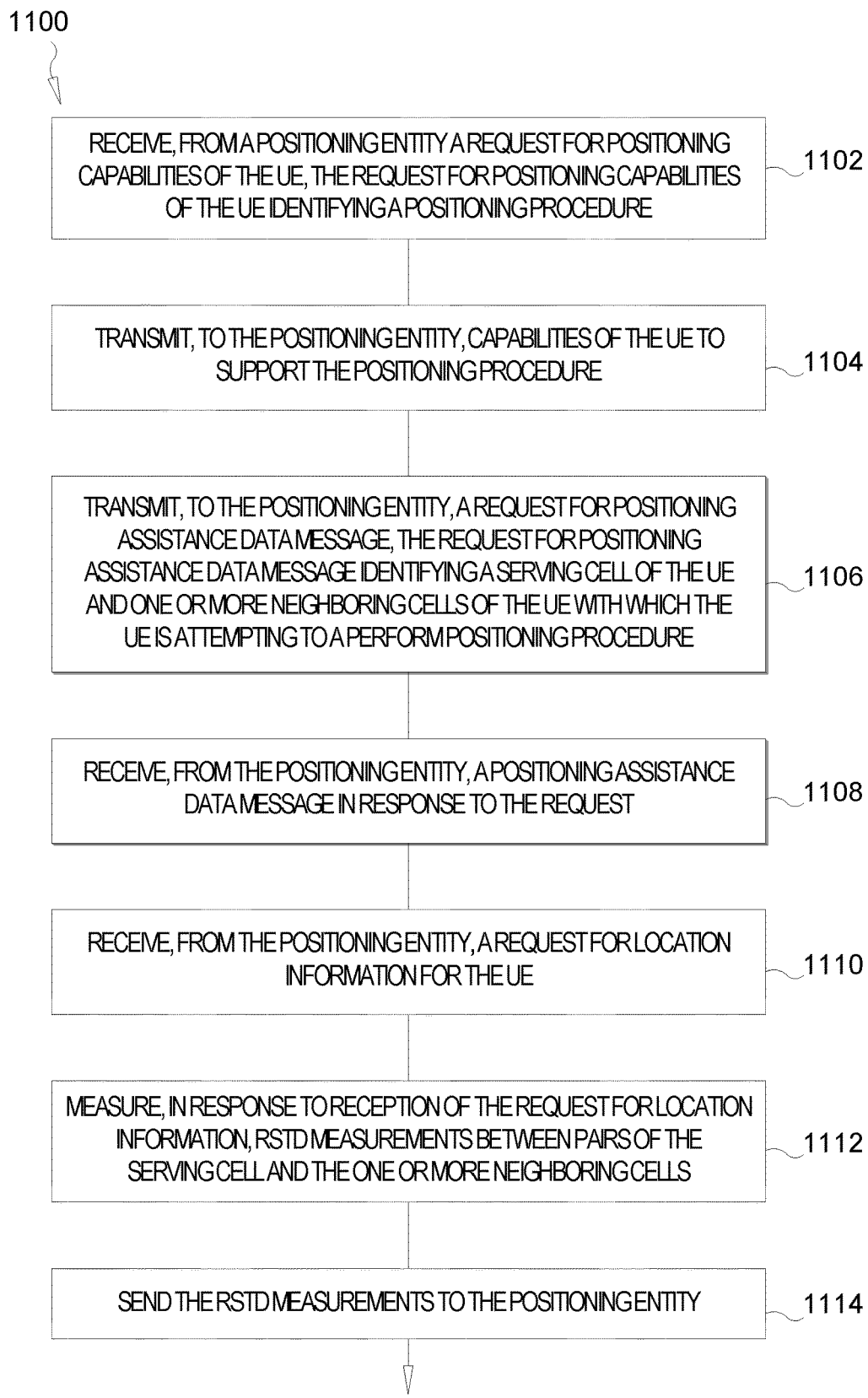
FIGS. 11 and 12 illustrate exemplary methods for providing positioning assistance data to a UE, according to aspects of the disclosure.

FIG. 11 illustrates an exemplary method for providing positioning assistance data to a UE, according to aspects of the disclosure. In an aspect, the method 1100 may be performed by the UE (e.g., any of the UEs described herein).

At 1102, the UE optionally receives, from a positioning entity (e.g., LMF 270, network node 630), a request for positioning capabilities of the UE, the request for positioning capabilities of the UE identifying a positioning procedure (e.g., OTDOA, RTT, UTDOA), as at 402 of FIG. 4. In an aspect, operation 1102 may be performed by receiver(s) 312, processing system 332, memory 340, and/or assistance data module 342, any or all of which may be considered means for performing this operation.

At 1104, the UE optionally sends, to the positioning entity, capabilities of the UE to support the positioning procedure, as at 404 of FIG. 4. In an aspect, operation 1104 may be performed by transmitter(s) 314, processing system 332, memory 340, and/or assistance data module 342, any or all of which may be considered means for performing this operation.

At 1106, the UE transmits, to the positioning entity, a request for positioning assistance data message, the request for positioning assistance data message identifying a serving cell (e.g., serving gNB 222) of the UE and one or more neighboring cells of the UE with which the UE is attempting to perform a positioning procedure, as at 502 and 512 of FIGS. 5A and 5B, respectively. In an aspect, operation 1106 may be performed by transmitter(s) 314, processing system 332, memory 340, and/or assistance data module 342, any or all of which may be considered means for performing this operation.

At 1108, the UE receives, from the positioning entity, a positioning assistance data message in response to the request at 1106. In an aspect, the positioning assistance data message may include at least positioning reference signal (e.g., PRS) configurations for the serving cell and the one or more neighboring cells identified in the request for positioning assistance data message, as at 504 and 514 of FIGS. 5A and 5B, respectively. In an aspect, operation 1108 may be performed by receiver(s) 312, processing system 332, memory 340, and/or assistance data module 342, any or all of which may be considered means for performing this operation.

At 1110, the UE optionally receives, from the positioning entity, a request for location information for the UE, as at 408 of FIG. 4. In an aspect, operation 1110 may be performed by receiver(s) 312, processing system 332, memory 340, and/or assistance data module 342, any or all of which may be considered means for performing this operation.

At 1112, the UE optionally measures, in response to reception of the request for location information, RSTD measurements between pairs of the serving cell and the one or more neighboring cells, as at 410 of FIG. 4. In an aspect, operation 1112 may be performed by WWAN transceiver 310, processing system 332, memory 340, and/or assistance data module 342, any or all of which may be considered means for performing this operation.

At 1114, the UE optionally sends the RSTD measurements to the positioning entity, as at 412 of FIG. 4. In an aspect, operation 1114 may be performed by transmitter(s) 314, processing system 332, memory 340, and/or assistance data module 342, any or all of which may be considered means for performing this operation.

Figure 12:
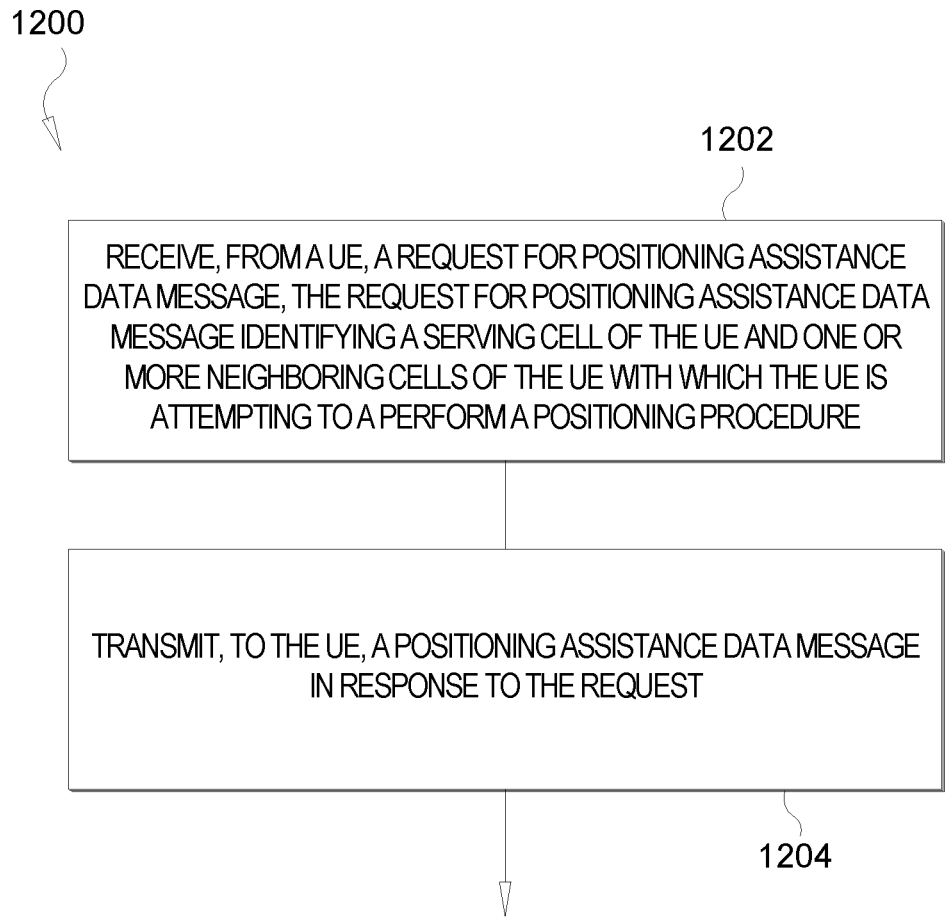

FIG. 12 illustrates an exemplary method 1200 for performing positioning assistance operations, according to aspects of the disclosure. In an aspect, the method 1200 may be performed by a positioning entity (e.g., location server 230, LMF 270, serving gNB 222, network node 630).

At 1202, the positioning entity receives, from a UE (e.g., any of the UEs described herein), a request for positioning assistance data message, the request for positioning assistance data message identifying a serving cell of the UE and one or more neighboring cells of the UE with which the UE is attempting to perform a positioning procedure. In an aspect, where the positioning entity is a location server or other network entity, operation 1202 may be performed by network interface(s) 390, processing system 394, memory 396, and/or assistance data module 398, any or all of which may be considered means for performing this operation. In an aspect, where the positioning entity is a component or module of a base station (e.g., gNB 222), operation 1202 may be performed by receiver(s) 352, processing system 384, memory 386, and/or assistance data module 388, any or all of which may be considered means for performing this operation.

At 1204, the positioning entity transmits, to the UE, a positioning assistance data message in response to the request. In an aspect, where the positioning entity is a location server or other network entity, operation 1204 may be performed by network interface(s) 390, processing system 394, memory 396, and/or assistance data module 398, any or all of which may be considered means for performing this operation. In an aspect, where the positioning entity is a component or module of a base station (e.g., gNB 222), operation 1204 may be performed by transmitter(s) 354, processing system 384, memory 386, and/or assistance data module 388, any or all of which may be considered means for performing this operation.

As will be appreciated, the above techniques reduce the overhead of sending assistance data to a UE (e.g., UE 204).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for performing positioning assistance operations at a user equipment (UE), comprising:
transmitting, to a positioning entity, a request for positioning assistance data message, the request for positioning assistance data message identifying a serving cell of the UE and one or more neighboring cells of the UE with which the UE is attempting to perform a positioning procedure, the request for positioning assistance data message further including a request for base station almanac information for each of the one or more neighboring cells;
receiving, from the positioning entity, a positioning assistance data message in response to the request, the positioning assistance data message including at least positioning reference signal configurations for the serving cell and the one or more neighboring cells identified in the request for positioning assistance data message, the positioning assistance data message further including the base station almanac information for each of the one or more neighbor cells, the base station almanac information comprising a geographic location of an antenna array of each neighboring cell of the one or more neighboring cells, an orientation, tilt, and height of the antenna array, an antenna and beam pattern, an extent to which the neighboring cell is synchronized with the serving cell, an extent to which a neighboring cell group-delay is calibrated, or any combination thereof;
obtaining positioning measurements of positioning reference signals transmitted from the serving cell and the one or more neighboring cells based on the positioning reference signal configurations; and
enabling a location of the UE to be determined based on at least the positioning measurements and the geographic location of the antenna array of each neighboring cell of the one or more neighboring cells.

2. The method of claim 1, wherein the request for positioning assistance data message further includes a request that the one or more neighboring cells transmit positioning reference signals to the UE.

3. The method of claim 1, wherein the serving cell and the one or more neighboring cells are identified in the positioning assistance data message by an index value corresponding to their position in the request for positioning assistance data message.

4. The method of claim 1, wherein the serving cell and the one or more neighboring cells are identified in the request for positioning assistance data message by physical cell identifiers (PCIs), enhanced cell identifiers (E-CIDs), virtual cell identifiers (VCIs), or any combination thereof.

5. The method of claim 1, wherein the positioning entity comprises a location management function (LMF).

6. The method of claim 5, wherein the request for positioning assistance data message is transmitted to and the positioning assistance data message is received from the LMF via Long-Term Evolution (LTE) positioning protocol (LPP).

7. The method of claim 5, wherein the request for positioning assistance data message is decoded by the serving cell and forwarded to the LMF via New Radio (NR) positioning protocol type A (NRPPa) or Long-Term Evolution (LTE) positioning protocol type A (LPPa).

8. The method of claim 1, wherein the positioning entity is a component of the serving cell.

9. The method of claim 8, wherein the request for positioning assistance data message is transmitted to and the positioning assistance data message is received from the positioning entity of the serving cell via radio resource control (RRC) signaling, medium access control control elements (MAC-CEs), downlink control information (DCI), or any combination thereof.

10. The method of claim 1, wherein enabling the location of the UE to be determined comprises:
calculating the location of the UE according to the positioning procedure.

11. The method of claim 1, wherein enabling the location of the UE to be determined comprises:
transmitting at least the positioning measurements to the positioning entity to enable the positioning entity to determine the location of the UE according to the positioning procedure.

12. The method of claim 1, further comprising:
receiving, from the positioning entity, a request for positioning capabilities of the UE, the request for positioning capabilities of the UE identifying the positioning procedure; and
transmitting, to the positioning entity, capabilities of the UE to support the positioning procedure.

13. The method of claim 1, further comprising:
receiving, from the positioning entity, a request for information about the one or more neighboring cells, wherein the UE transmits the request for positioning assistance data message in response to reception of the request for information about the one or more neighboring cells.

14. A method for performing positioning assistance operations at a positioning entity, comprising:
receiving, from a user equipment (UE), a request for positioning assistance data message, the request for positioning assistance data message identifying a serving cell of the UE and one or more neighboring cells of the UE with which the UE is attempting to perform a positioning procedure, the request for positioning assistance data message further including a request for base station almanac information for each of the one or more neighboring cells; and
transmitting, to the UE, a positioning assistance data message in response to the request, the positioning assistance data message including at least positioning reference signal configurations for the serving cell and the one or more neighboring cells identified in the request for positioning assistance data message, the positioning assistance data message further including the base station almanac information for each of the one or more neighbor cells, the base station almanac information comprising a geographic location of an antenna array of each neighboring cell of the one or more neighboring cells, an orientation, tilt, and height of the antenna array, an antenna and beam pattern, an extent to which the neighboring cell is synchronized with the serving cell, an extent to which a neighboring cell group-delay is calibrated, or any combination thereof.

15. The method of claim 14, wherein the request for positioning assistance data message further includes a request that the one or more neighboring cells transmit positioning reference signals to the UE.

16. The method of claim 15, further comprising:
instructing at least the one or more neighboring cells to transmit the positioning reference signals to the UE.

17. The method of claim 14, wherein the serving cell and the one or more neighboring cells are identified in the positioning assistance data message by an index value corresponding to their position in the request for positioning assistance data message.

18. The method of claim 14, wherein the serving cell and the one or more neighboring cells are identified in the request for positioning assistance data message by physical cell identifiers (PCIs), enhanced cell identifiers (E-CIDs), virtual cell identifiers (VCIs), or any combination thereof.

19. The method of claim 14, wherein the positioning entity comprises a location management function (LMF).

20. The method of claim 19, wherein the request for positioning assistance data message is received from and the positioning assistance data message is transmitted to the UE via Long-Term Evolution (LTE) positioning protocol (LPP).

21. The method of claim 19, wherein the request for positioning assistance data message is decoded by the serving cell and forwarded to the LMF via New Radio (NR) positioning protocol type A (NRPPa) or Long-Term Evolution (LTE) positioning protocol type A (LPPa).

22. The method of claim 14, wherein the positioning entity is a component of the serving cell.

23. The method of claim 22, wherein the request for positioning assistance data message is received from and the positioning assistance data message is transmitted to the UE via radio resource control (RRC) signaling, medium access control control elements (MAC-CEs), downlink control information (DCI), or any combination thereof.

24. The method of claim 14, further comprising:
receiving, from the UE, positioning measurements of positioning reference signals transmitted from the serving cell and the one or more neighboring cells based on the positioning reference signal configurations; and
calculating a location of the UE based on at least the positioning measurements and the geographic location of the antenna array of each neighboring cell of the one or more neighboring cells.

25. The method of claim 14, further comprising:
transmitting, to the UE, a request for positioning capabilities of the UE, the request for positioning capabilities of the UE identifying the positioning procedure; and
receiving, from the UE, capabilities of the UE to support the positioning procedure.

26. The method of claim 14, further comprising:
transmitting, to the UE, a request for information about the one or more neighboring cells, wherein the UE transmits the request for positioning assistance data message in response to reception of the request for information about the one or more neighboring cells.

27. A user equipment (UE), comprising:
a memory;
at least one transceiver; and
at least one processor communicatively coupled to the memory and the at least one transceiver, the at least one processor configured to:
transmit, via the at least one transceiver, to a positioning entity, a request for positioning assistance data message, the request for positioning assistance data message identifying a serving cell of the UE and one or more neighboring cells of the UE with which the UE is attempting to perform a positioning procedure, the request for positioning assistance data message further including a request for base station almanac information for each of the one or more neighboring cells;
receive, via the at least one transceiver, from the positioning entity, a positioning assistance data message in response to the request, the positioning assistance data message including at least positioning reference signal configurations for the serving cell and the one or more neighboring cells identified in the request for positioning assistance data message, the positioning assistance data message further including the base station almanac information for each of the one or more neighbor cells, the base station almanac information comprising a geographic location of an antenna array of each neighboring cell of the one or more neighboring cells, an orientation, tilt, and height of the antenna array, an antenna and beam pattern, an extent to which the neighboring cell is synchronized with the serving cell, an extent to which a neighboring cell group-delay is calibrated, or any combination thereof;
obtain positioning measurements of positioning reference signals transmitted from the serving cell and the one or more neighboring cells based on the positioning reference signal configurations; and
enable a location of the UE to be determined based on at least the positioning measurements and the geographic location of the antenna array of each neighboring cell of the one or more neighboring cells.

28. The UE of claim 27, wherein the request for positioning assistance data message further includes a request that the one or more neighboring cells transmit positioning reference signals to the UE.

29. The UE of claim 27, wherein the at least one processor configured to enable the location of the UE to be determined comprises the at least one processor configured to:
calculate the location of the UE according to the positioning procedure.

30. A positioning entity, comprising:
a memory;
at least one transceiver; and
at least one processor communicatively coupled to the memory and the at least one transceiver, the at least one processor configured to:
receive, via the at least one transceiver, from a user equipment (UE), a request for positioning assistance data message, the request for positioning assistance data message identifying a serving cell of the UE and one or more neighboring cells of the UE with which the UE is attempting to perform a positioning procedure, the request for positioning assistance data message further including a request for base station almanac information for each of the one or more neighboring cells; and
transmit, via the at least one transceiver, to the UE, a positioning assistance data message in response to the request, the positioning assistance data message including at least positioning reference signal configurations for the serving cell and the one or more neighboring cells identified in the request for positioning assistance data message, the positioning assistance data message further including the base station almanac information for each of the one or more neighbor cells, the base station almanac information comprising a geographic location of an antenna array of each neighboring cell of the one or more neighboring cells, an orientation, tilt, and height of the antenna array, an antenna and beam pattern, an extent to which the neighboring cell is synchronized with the serving cell, an extent to which a neighboring cell group-delay is calibrated, or any combination thereof.

\* \* \* \* \*